United States Patent [19]

Haning et al.

[11] 4,053,215
[45] Oct. 11, 1977

[54] FILM STRIP HANDLING APPARATUS AND METHOD

[75] Inventors: James O. Haning, Palo Alto; Bram Kool, Saratoga; Jules G. Moritz, Los Altos Hills; Robert Mizrahi, El Cerrito, all of Calif.

[73] Assignee: Microform Data Systems, Inc., Mountain View, Calif.

[21] Appl. No.: 646,133

[22] Filed: Jan. 2, 1976

Related U.S. Application Data

[62] Division of Ser. No. 536,510, Dec. 26, 1974, Pat. No. 3,963,336, which is a division of Ser. No. 313,902, Dec. 11, 1972, Pat. No. 3,909,122, which is a division of Ser. No. 101,224, Dec. 24, 1970, Pat. No. 3,743,400.

[51] Int. Cl.$^2$ .................. G03B 23/04; B65H 3/32
[52] U.S. Cl. ..................... 353/116; 271/113; 353/118
[58] Field of Search ............. 353/25, 26 R, 26 A, 353/27 R, 27 A, 103, 118, 104, 113, 114, 116; 271/109, 113; 206/73

[56] References Cited

U.S. PATENT DOCUMENTS

| 3,290,987 | 12/1966 | James et al. | 353/26 A |
| 3,528,735 | 9/1970 | Bluitt et al. | 353/27 A |
| 3,702,697 | 11/1972 | Leutwein et al. | 271/109 |

Primary Examiner—Steven L. Stephan
Attorney, Agent, or Firm—Townsend and Townsend

[57] ABSTRACT

Apparatus and a method for handling and reading any one of a number of film strips, each having a number of segments with each segment containing a plurality of information-containing, high-reduction image frames. The film strips are housed in a cassette which is movable with respect to a fixed reference to align a desired film strip with a reading station disposed across the optical path of an optical system. A film strip is moved out of the cassette by a force applied to one of its side edges. Control information carried by each film strip is sensed as the film strip moves out of the cassette and the sensed information is used to control the distance through which the film strip moves so that a particular segment thereof will stop at the reading station. The optical system is moved relative to the reading system so that the optical path of the optical system is selectively alignable with a particular image frame of the film strip removed from the cassette.

12 Claims, 12 Drawing Figures

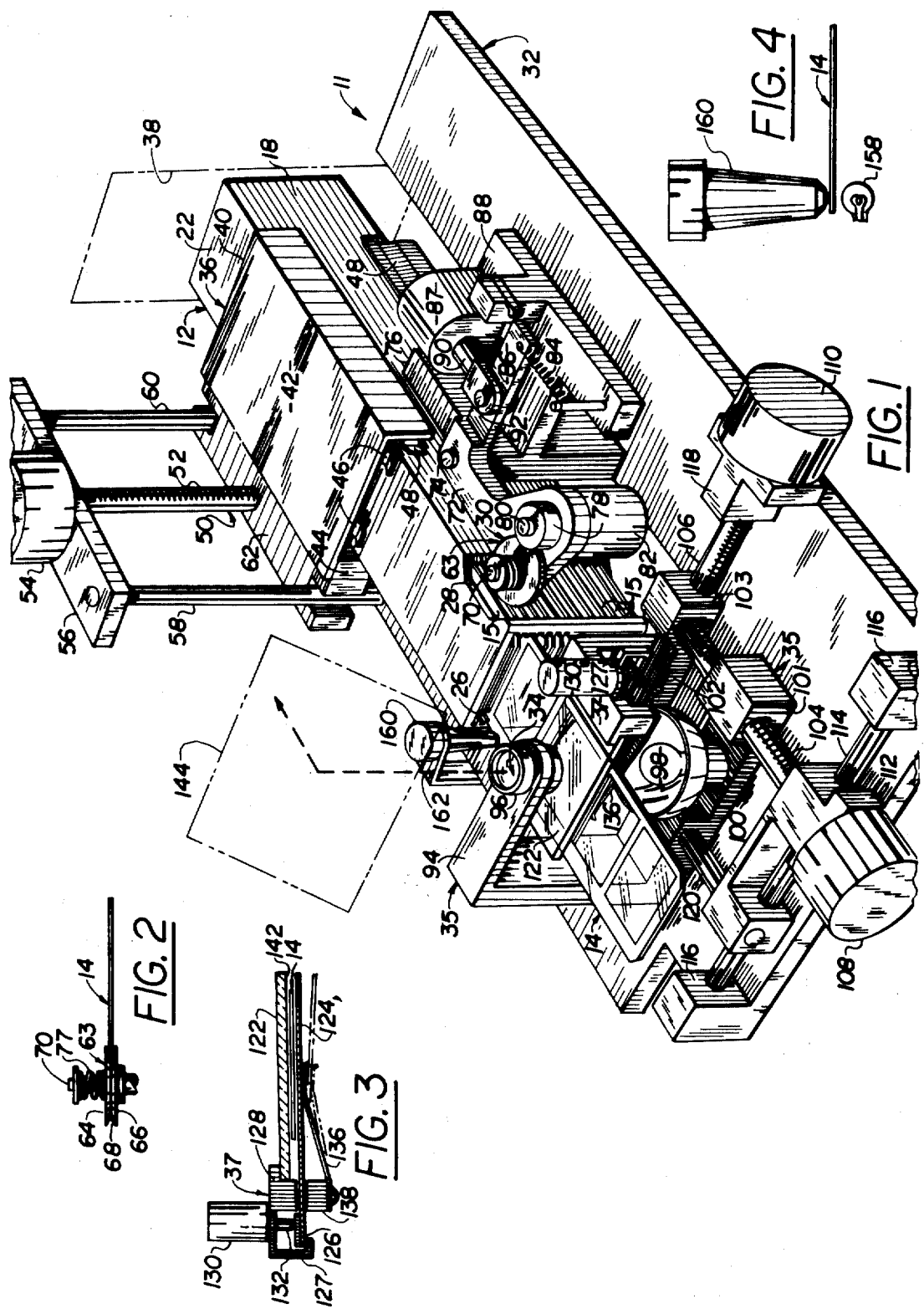

NULLING PORTIONS SHADED

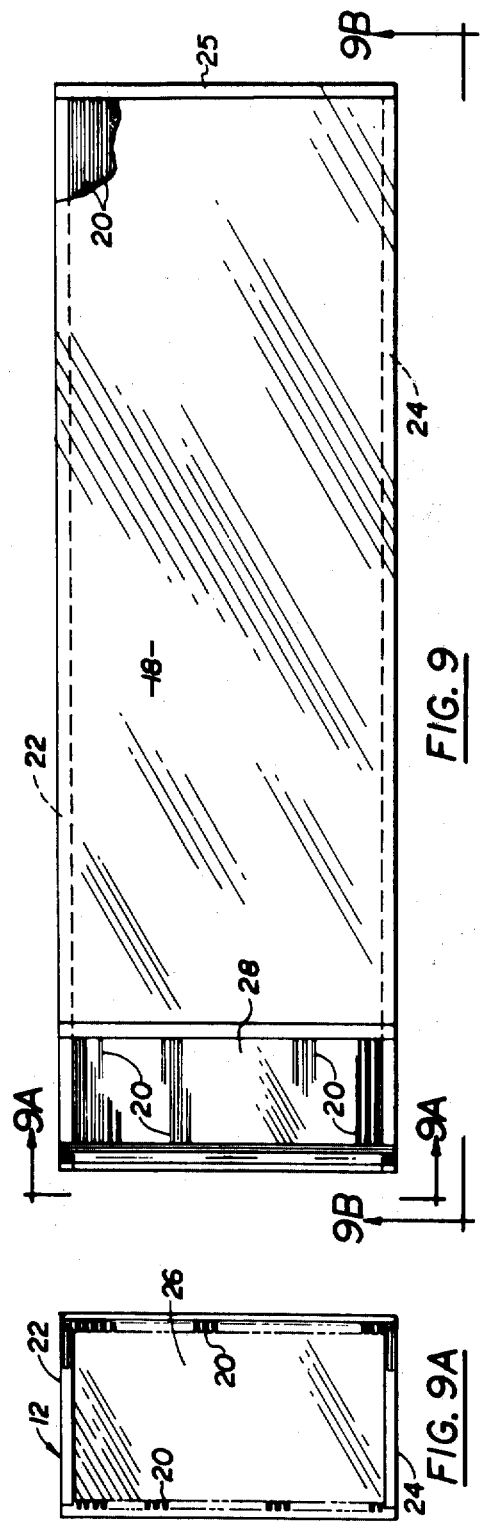
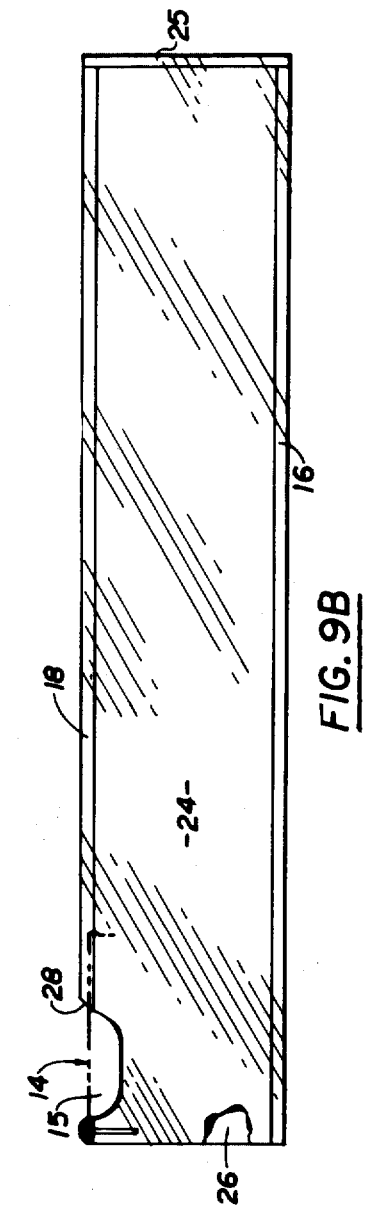
FIG. 9
FIG. 9A
FIG. 9B

FILM STRIP HANDLING APPARATUS AND METHOD

This is a division, of application Ser. No. 536,510 filed Dec. 26, 1974, now U.S. Pat. No. 3,963,336 the latter application being a division of Ser. No. 313,902 filed Dec. 11, 1972, now U.S. Pat. No. 3,909,122, Ser. No. 313,902 having been a divisional application of Ser. No. 101,224 filed Dec. 24, 1970, now U.S. Pat. No. 3,743,400.

This invention relates to improvements in information storage and retrieval systems and, more particulary, to a system for quickly and automatically accessing information from any one of a plurality of microfilm strips defining a storage medium.

Conventional apparatus for reading information from microfilm strips generally is limited for use with film strips whose image frames are of relatively low reduction, such as 40X or the like. At this value, a limited amount of information can be stored and retrieved from a given number of film strips; also, such apparatus generally moves the film strip relative to its optical system to change from image frame to image frame, thus requiring high precision in aligning a desired image frame with the optical path of the optical system. Focusing of the image of a desired frame presents a problem with conventional apparatus after an image frame moves into position to be read.

The present invention is directed to improvements over such a conventional film strip reading system by providing an improved apparatus and a method for handling and reading any one of a number of film strips having a group of segments thereon with each segment having high reduction image frames of the order of 160X to 210X. The film strips are of a size suitable for insertion in stacked relationship in a relatively small cassette of improved construction. The information on each segment of any one of the film strips can be retrieved automatically and at high speeds so that a vast amount of information can be made readily available through the use of the invention.

The apparatus operates to shift the cassette so that a selected film strip is aligned with film strip hold-down means defining a reading station with which the optical path of an optical system can be aligned. An edge drive means adjacent to the operative position of the cassette is engageable with one side edge of the selected film strip and operates to move the same partially out of the cassette and toward the reading station, the hold-down means having been previously conditioned to permit the film strip to move unobstructedly toward the reading station.

Each film strip has code indicia on one margin thereof, the indicia corresponding to respective segments of the film strip and being readable by a sensor adjacent to the path of travel of the film strip as the latter moves partially out of the cassette. The information sensed by the sensor is used to limit the distance of travel of the film strip so that a specific segment will stop at the reading station. The optical system is mounted on an X-Y translation mechanism so that it can move relative to the reading station. Thus, the optical path of the optical system can be moved into alignment with the position at the reading station to be occupied by a preselected image frame of the specific segment of the film strip as the latter is being moved out of the cassette. Moreover, the film strip hold-down means provides for automatic, high-speed focusing of the optical system with respect to the film strip, whereby a particular image frame can quickly be moved into position for projection of the image thereof in a magnified form by the optical system onto a viewing screen associated with the apparatus.

The apparatus can be controlled with suitable control structure, such as a push-button control unit, which actuates the various parts of the apparatus in sequence to position the cassette, condition the hold-down means, move a film strip out of the cassette, sense the control indicia on the moving film strip, stop the movement of the film strip, shift the optical system, and focus the latter when a desired image frame is in its optical path. The control of the apparatus can be achieved, for instance, with the use of suitable control circuitry capable of processing a manually applied input representing a number, such as a seven-digit number, whose first two digits define the film strip to be selected, its third digit defines the desired segment of the selected film strip, and its fourth and fifth digits and the sixth and seventh digits defining respective X and Y coordinates of a particular image frame of the desired segment. Once the full or partial number is entered into the control unit, the apparatus will thereafter respond quickly and automatically to perform the aforesaid functions.

In lieu of a control unit in which the input number is manually applied, a computer input can be utilized with the apparatus. In this way, the apparatus can be controlled by the computer to access certain information according to a predetermined sequence of presentation of the information.

The invention allows for automatic retrieval of microfilm information of extremely high density on a film strip. The features of the invention render the same especially suitable for storing extremely large amounts of photographic information in a manner such that an entire library, for instance, can be contained on the film strips housed in a relatively few cassettes with the cassettes being of a size suitable for storage in a limited space. The invention, therefore, utilizes the advantages of microfilm storage of graphic information yet provides for automatic information retrieval without requiring operator attention other than to provide an input signal such as by manually operating a keyboard or other input structure to initiate the information retrieval action.

The primary object of this invention is, therefore, to provide an improved apparatus and method for automatic retrieval of information from any one of a plurality of film strips, each having a number of high-reduction image frames thereon, wherein the information recorded on a particular image frame of a film strip can be selectively and automatically accessed at relatively high speeds without having to move the corresponding film strip relative to a fixed optical system as in conventional equipment to thereby minimize access time, yet provide a system which assures the precision alignment of a selected image frame and the optical path of an optical system.

Another object of this invention is to provide apparatus and a method of the type described wherein any one of a plurality of film strips carried in a cassette can be selectively drawn out of the cassette and positioned at a film reading station near an optical system as the latter is moved relative to the reading station to orient its optical path in alignment with the position to be occupied by a selected image frame on the film strip drawn out of the cassette to thereby minimize the need for precisely positioning the film strip relative to the reading station to access the information on the selected image frame.

A further object of this invention is to provide an improved film strip drive means for the apparatus of the aforesaid character wherein the drive means is operable with a cassette having a plurality of film strips stacked therein and is movable into a position for engaging an edge portion of a predetermined film strip to apply a moving force thereto in the plane of the film strip itself to permit the film strip to be quickly and easily moved out of the cassette or returned thereto depending upon the operational state of the apparatus.

Still another object of this invention is to provide an improved film strip of the type described wherein the film strip has coded indicia on one margin thereof which can be sensed and used to generate a control signal to operate the film strip drive means of the apparatus to stop the film strip when a predetermined segment thereof is adjacent to the optical system and as the optical system itself is being moved to shift its optical path into alignment with the position to be occupied by a predetermined image frame.

Another object of this invention is to provide a cassette for use with the aforesaid apparatus wherein the cassette is constructed to permit any one of a plurality of film strips stacked therein to be moved out of the same and toward an optical system while the other film strips remain stacked therein and as the cassette remains in a fixed position relative to the optical system.

Other objects of this invention will become apparent as the following specifications progresses, reference being had to the accompanying drawings for an illustration of the apparatus.

In the drawings:

FIG. 1 is a perspective view of the film strip handling and reading apparatus of this invention showing one of a plurality of film strips removed from a cassette and in a position to be read by the optical system of the apparatus;

FIG. 2 is a fragmentary, side elevational view of a portion of the means for moving a film strip into and out of the cassette;

FIG. 3 is a hold-down means for releasably maintaining a film strip in a fixed position with respect to the optical system of the apparatus;

FIG. 4 is an enlarged, fragmentary, side elevational view of the light source and sensing means for reading the coded areas along one side margin of a film strip;

FIG. 9 is a side elevational view of the film strip cassette;

FIG. 9A is an end elevational view of the cassette looking in the direction of line 9A—9A of FIG. 9;

FIG. 9B is a bottom plan view of the cassette looking in the direction of line 9B—9B of FIG. 9.

Figure 5:
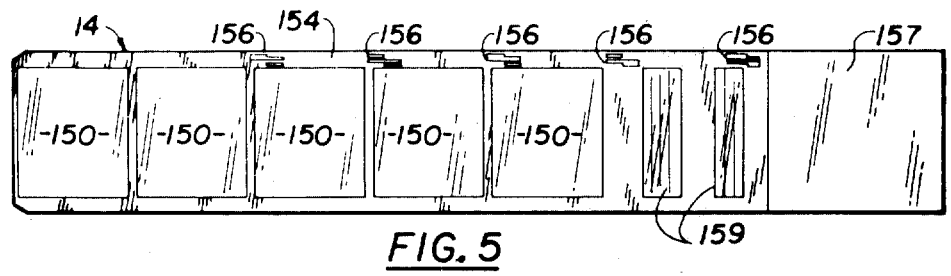
FIG. 5 is an enlarged, top plan view of a film strip removed from the cassette.

The film strip handling and reading apparatus of this invention is broadly denoted by the numeral 11 and is adapted to be utilized with a film strip cassette 12 carrying a number of film strips 14 in generally parallel, horizontal planes, whereby the film strips are in a vertically stacked relationship. The cassette is removably mounted on apparatus 11 in a manner to permit a selected one of the film strips to be partially removed therefrom and directed to a reading station near an optical system of the apparatus for readout of the information on a particular image frame of the film strip, following which the film strip can be returned to the cassette and another selected film strip can then be partially removed for information readout purposes. The way in which the foregoing occurs and the way in which the information is located on each film strip will be set forth hereinafter.

Cassette 12 (FIGS. 9, 9A and 9B) has a pair of opposed sides 16 and 18 with each side being provided with a series of parallel, longitudinally extending grooves 20 for receiving respective side margins of the film strips, there being a groove 20 on side 16 for each groove 20 on side 18. One end 26 of the cassette is open to permit the film strips to be inserted therein. The cassette also has a top 22, a bottom 24, and an end wall 25. Side 18 has an opening 28 therein and top 22 and bottom 24 are cut away, as shown in FIG. 9B, so that portions of the side margins of the film strips will be accessible to a film edge drive means 30 to be described. FIG. 9B shows, in dashed lines, a side marginal edge portion 15 of the lowermost film strip adjacent to opening 28, the corresponding portions 15 of the other film strips not being shown but it is to be understood that they are in vertical alignment with portion 15 shown in FIG. 9B.

Apparatus 11 includes a base plate 32 having a shiftable optical system 34 adjacent to one end thereof for reading the information on a film strip 14 aligned therewith. An X-Y translation mechanism 35 is also carried on the base plate and is operable to move the optical system relative to a stationary film strip hold-down means 37. A cassette holder 36 is disposed on the base plate adjacent to the opposite end of the same to hold the cassette in an operative position adjacent to film edge drive means 30. Apparatus 11 is adapted to be mounted in a housing (not shown) having an opening 38 through which the cassette can be moved as it is directed into coupled relationship with holder 36.

Holder 36 includes a C-shaped bracket 40 having a top 42, a side 44 and a bottom (not shown), the bracket being shaped to receive the cassette therein in the manner shown in FIG. 1. Typically, the cassette will have a rectangular cross section as shown in FIGS. 9, 9A and 9B and bracket 40 will be substantially of the same cross section but slightly larger in dimensions. A pair of leaf springs 46 carried on the inner surface of top 42 bias cassette 12 downwardly and against the bottom of bracket 40. Also, a leaf spring 48 urges the cassette against side 44. A stop (not shown) is provided to limit the inward movement of the cassette into the apparatus housing. In this way, the operative position of the cassette is determined so that film edge drive means 30 will be properly aligned with opening 28 of cassette side 18.

While the film strips 14 have been described above as being in generally parallel, horizontal planes, it is to be understood that such planes need not be horizontal. Also, bracket 40 need not be C-shaped. For instance, it can be in the form of a rectangular, hollow, rigid tube.

Holder 36 is coupled with an elevating device 50 comprised of a worm 52 coupled with a reversible d.c. motor 54 mounted on a cross bar 56 secured to the upper ends of a pair of support rods 58 and 60. The rods are anchored at their lower ends to base plate 32 and are substantially parallel with worm 52. The worm is threaded into a side bar 62 secured to side 44 of bracket 40. Member 62 has notched ends to shiftably receive rods 58 and 60. The lower end of the worm is coupled with a bearing (not shown) carried by base plate 32. Thus, when motor 54 is energized, worm 52 is rotated relative to bar 62, thereby causing bracket 40 to move up or down depending upon the direction of rotation of worm 52.

Film edge drive means 30 includes a wheel 63 defined by a pair of disks 64 and 66 (FIG. 2) which are in abutment with each other but are separable from each other. The disks have sloping, outer peripheral margins which cooperate to form a substantially V-shaped outer periphery 68 for wheel 63 defined by disks 64 and 66. The disks are mounted on a shaft 70 carried by an arm 72 pivotally mounted on a pin 74 secured to a block 76 rigid to and extending upwardly from base plate 32. Disk 66 is rigid to shaft 70 and disk 64 is shiftable axially of this shaft. A coil spring 77 (FIG. 2) surrounding shaft 70 biases disk 64 into engagement with disk 66.

Wheel 63 is rotated by a pressure roller 78 mounted on a shaft 80 of a reversible d.c. motor 82 carried by and depending from arm 72. As motor 82 is energized, pressure roller 78 is rotated in a corresponding direction to, in turn, impart rotation to wheel 63 in the opposite direction. Other ways of making a driving connection between wheel 63 and motor 82 can be used, if desired.

Arm 72 is biased in a clockwise sense when viewing FIG. 1 by a spring 84 coupled to one end of an extension 86 rigid to and extending laterally from arm 72. Thus, wheel 63 is urged toward and into opening 28 of cassette 12 and into engagement with the longitudinal edge of a film strip portion 15 aligned therewith. The cassette is, at all times, positioned with a film strip portion 15 aligned with the V-shaped, outer periphery 68 of wheel 63; thus, spring 84 biases the wheel into frictional engagement with the adjacent film strip portion. In this way, the film strip can be moved either out of or back into the cassette depending upon the direction of rotation of motor drive shaft 80. Since upper disk 64 can move upwardly relative to lower disk 66, the adjacent film strip portion 15 can be slightly pinched between the disks to provide a more positive driving connection between the film strip and wheel 63.

A solenoid 87 carried on block 88 is secured to base plate 32 and has an armature 90 pivotally connected by a pin 92 to extension 86. Thus, when the solenoid is energized, arm 72 is rotated in a counterclockwise sense about pin 74 against the bias force of spring 84. This causes wheel 63 to move out of engagement with the adjacent film strip portion 15, thereby permitting cassette 12 to be raised and lowered under the influence of worm 52 and motor 54. When solenoid 87 is de-energized, wheel 63 moves back into engagement with the adjacent film strip portion 15. Thereafter, motor 82 can be energized to move the film strip partially out of the cassette.

Translation mechanism 35 includes a vertically disposed yoke 94 (FIG. 1) having an optical system 34 thereon, the optical system including a lens assembly 96 at the upper end of the yoke and a light source 98 at the lower end thereof. The yoke 94 is movable relative to the base plate and, for purposes of illustration, it has a flat, lower surface which is slidable over the flat, upper surface of the base plate. Other mounting means for the yoke can be used provided that it permits the yoke to shift relative to the base plate.

Yoke 94 has a lower extension 100 adjacent to a second extension 102, the extensions being movable relative to each other and relative to the base plate. The extensions have bosses 101 and 103, respectively, which are threadably coupled with respective, mutually perpendicular worms 104 and 106. The worms are driven by respective reversible d.c. drive motors 108 and 110. Worm 104 is out of the plane of worm 106 and is carried by a follower 112 shiftably mounted on a stationary support rod 114 spaced above the upper surface of base plate 32 by posts 116 (FIG. 1). Rod 114 is parallel to and substantially coplanar with worm 106.

A bearing 118 supports the end of worm 106 connected to motor 110. A support rod 120 substantially coplanar with and parallel to worm 104 is rigidly secured at one end to follower 112 and is shiftably carried at its opposite end by extension 102. Extension 100 is also shiftably mounted on support rod 120; thus, yoke 94 and extension 102 can move together in a direction parallel to rod 114 under the influence of motor 110. The yoke can also move in a direction parallel with rod 120 and relative to extension 102 under the influence of motor 108. In this way, optical system 34 can move in the X-Y plane defined by the flat, upper surface of the base plate in any one of a number of different directions under the combined actions of motors 108 and 110, it being understood that the motors can be in operation at the same time.

Figure 8:
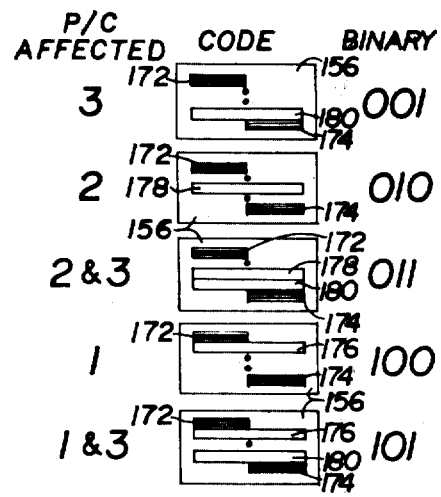
FIG. 8 is a graphic view in tabular form of the coding system used on each film strip.

Light source 98 is vertically aligned with and below lens assembly 96 to direct light through hold-down means 37 to lens assembly 96. Means 37 includes a pair of transparent windows 122 and 124, window 124 being below window 122 and being pivotally mounted (FIG. 3) by a C-shaped extension 127 of a bracket 128 secured in any suitable manner to the base plate for movement about a substantially horizontal axis defined by a pivot point 126. A solenoid 130 carried on bracket 128 has an armature 132 in engagement with the end of window 124 near to but spaced from pivot point 126. A pair of leaf springs 136, only one of which is shown in FIG. 8, are carried by respective posts 138 on bracket 128 to bias window 124 upwardly toward window 122. Solenoid 130, when armature 132 is forced downwardly, operates to pivot window 124 downwardly into the dashed line position of FIG. 8 so that a film strip 14 can move into and out of the region between windows 122 and 124. When the armature of the solenoid 130 is urged upwardly, springs 136 force the lower window 124 upwardly against the film strip to urge the latter against the bottom surface 142 of window 122. Surface 142 is optically flat so that a film strip 14 clamped between the two windows will be properly focused with respect to lens assembly 96 at all times.

When light passes from source 98 through windows 122 and 124 and film strip 14, it emerges from the upper window, passes through lens assembly 96 and then can be directed onto a viewing screen carried by the apparatus housing. For purposes of illustration only, a mirror 144 shown in FIG. 1 in dashed lines can be used to change to path of the light emerging from lens assembly 96. A screen 145 is shown in alignment with mirror 144 in the schematic representation of FIG. 10. Window 124 protects the film strip thereabove from the heat of light source 98.

Figure 6:
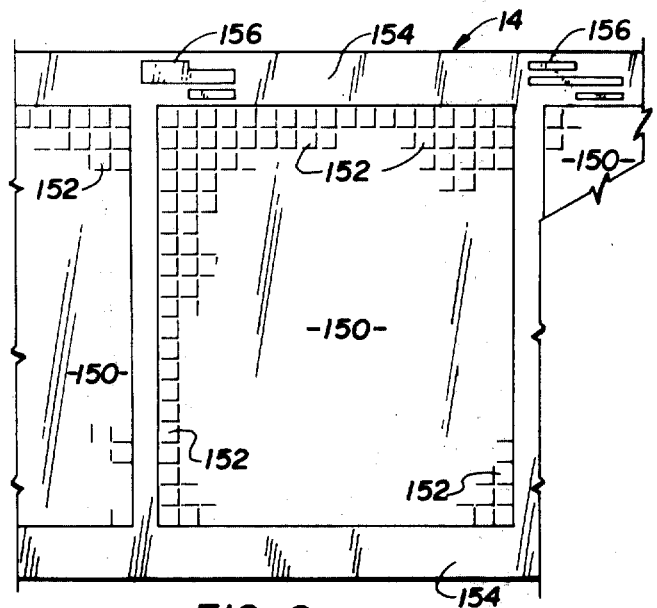
FIG. 6 is an enlarged, fragmentary, top plan view of the film strip showing one segment thereof and the plurality of image frames for the segment.

Each film strip 14 has a number of segments 150 (FIG. 5) along the length thereof with each segment having a plurality of image frames 152 (FIG. 6). For purposes of illustration, there are five segments and 420 frames in each segment. Other arrangements of the segments and frames can be utilized as desired. Each film strip 14 has a side margin 154 provided with a coding system for segments 150, there being a code area 156 for each segment, respectively. As shown in FIG. 5, such code areas 156 are staggered with respect to the corresponding segments 150 and are spaced apart by a distance equal to the spacing between corresponding segments.

Figure 7:
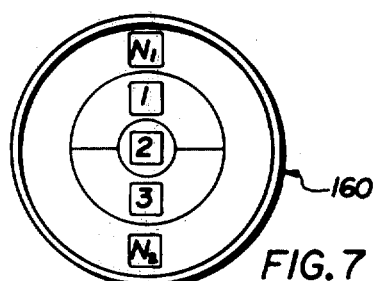
FIG. 7 is an enlarged, schematic, top plan view of the sensing means of FIG. 4, showing the relative positions of a number of light sensing devices.

A code reading device is carried by base plate 32 and includes a light source 158 (FIG. 4) and a light sensor 160 having five photocells for sensing respective bands of information on each code area 156. A bracket 162 (FIG. 1) mounts sensor 160 so that its lower end is aligned with and directly above the region through which margin 154 of a film strip passes when the latter moves outwardly of cassette 12 toward hold-down means 37. The arrangement of the five photocells in sensor 160 is shown in FIG. 7, the photocells being denoted by N1, 1, 2, 3, and N2.

Each code area 156 has a pair of outer bands 172 and 174 which are sensed by photocells N1 and N2. These photocells develop signals sent to motor 82 to cause the latter to rotate wheel 63 until a preselected segment 150 is properly positioned with respect to optical system 34. This position is determined by a null point and such null point is reached when photocell N1 senses the right end of band 172 (FIG. 8) and when photocell N2 senses the left end of band 174. The space between outer bands 172 and 174 of each code area 156 can be provided with any combination of three inner bands 176, 178 and 180 to represent a particular number, such as in binary form. FIG. 8 shows in tabular form the arrangements of such bands which present binary numbers 1 through 5 for the five code areas 156.

Photocells 1, 2 and 3 between photocells N1 and N2 (FIG. 7) sense respective inner bands 176, 178 and 180 of a corresponding code area 156. They operate to develop signals which are to be compared with a specific input signal to effect operation of drive motor 82 until a desired segment 150 is between windows 122 and 124, at which time motor 82 is stopped.

Figure 10:
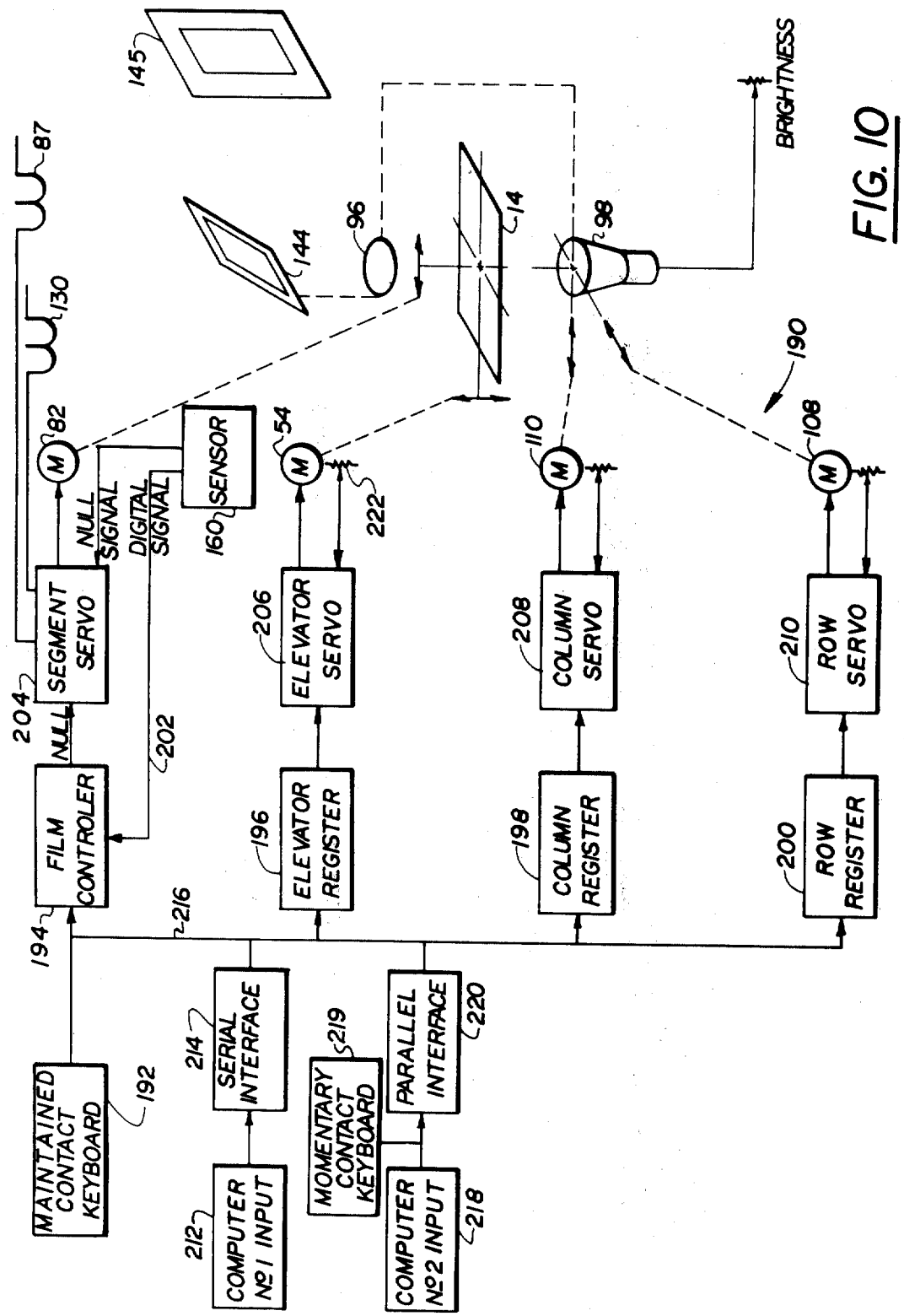
FIG. 10 is a block diagram of the control means for the various drive motors of the apparatus.

The control system 190 of apparatus 11 is shown in FIG. 10, the various drive motors, a film strip, and the optical system being shown schematically while the electronics for operating the motors are shown in block form. Control system 190 includes an input device 192 such as a keyboard which directs input signals to a film controller 194, an elevator register 196, a column register 198 and a row register 200. Film controller 194 includes a comparator (not shown) which receives the input signal from device 192 and a digital signal from sensor 160 over line 202. The output of controller 194 is directed to a servo 204 which effects operation of motor 82, the latter being operable to rotate wheel 63 to advance or retract a film strip 14 with respect to cassette 12. A film strip is only partially removed from cassette 12, at least a portion 157 (FIG. 5) of the film strip always remaining in the cassette. Portion 157 is adjacent to identifying indicia 159 on each film strip.

Solenoids 87 and 130 are coupled with servo 204 in a manner to enable the same to effect operation of motor 82 when wheel 63 engages a film strip and when window 124 is in the dashed line position of FIG. 3. Thus, a film strip can move uninterruptedly either out of or into the cassette.

Elevator register 196 controls an elevator servo 206 which, in turn, effects operation of motor 52. Column register 198 controls a column servo 208 to, in turn, effect operation of motor 110; and row register 200 controls a row servo 210 which effects operation of motor 108.

Input device 192, as illustrated in FIG. 10, is a maintained contact keyboard. In lieu of this type of input, a computer input unit 212 can be used to supply the input signal. For purposes of illustration, unit 212 is of the type which is utilized with serial interface means 214 to supply a signal to the signal input line 216. Alternatively, another computer input unit 218 operated by a momentary contact keyboard 219 can be used with parallel interface means 220 to provide a second type of input signal to line 216.

Each of motors 52, 108 and 110 has a potentiometer associated with it for developing a feedback signal which is compared with an input signal to derive the appropriate output signal to the motor. For instance, a comparator is associated with elevator servo 206 to compare the input signal thereto from input device 192 with the feedback signal from the corresponding potentiometer 222.

OPERATION

Apparatus 11 is placed into use by first inserting cassette 12 into the housing of the apparatus through opening 38. The cassette is urged into bracket 40 until an innermost stop is reached.

Control unit 190 (FIG. 10) coupled with the various drive motors is then operated by manually punching in the digits of the input signal on keyboard device 192. This causes solenoid 87 to be energized to urge arm 72 away from the cassette. Then motor 54 is energized to raise or lower the cassette by means of worm 52. When the cassette has been moved to a location at which the desired film strip is aligned with hold-down means 37, motor 54 is de-energized, following which solenoid 87 is de-energized and spring 84 returns wheel 63 to its operative position in driving engagement with the desired film strip portion 15 aligned therewith. Solenoid 130 is actuated before motor 82 is energized to move window 124 away from window 122. Thus, when such motor is energized, a film strip can be partially moved out of the cassette through open end 26 thereof and moved between windows 122 and 124. As the film strip moves out of the cassette, the code areas 156 thereon are sensed by sensor 160 receiving light from source 158 until the desired code has been received, whereupon motor 82 is deactuated, stopping the film at the desired segment. While the foregoing is occurring, motors 108 and 110 are actuated to move yoke 94 in the proper direction to align the optical path of lens assembly 96 and source 98 with the region a preselected frame of the desired segment will occupy when the film strip stops. In this way, the optical system itself moves relative to the film strip to the desired frame automatically, notwithstanding the relatively large number of frames on each segment. When the film strip has stopped, solenoid 130 is deactuated to cause window 124 to force the film strip into engagement with the lower, optically flat surface 142 of window 122. Light from source 98 is then projected through the preselected frame, through lens assembly 96, into mirror 14, and then onto the viewing screen, whereby the image of the frame can be seen on a greatly enlarged scale, the magnification being of the order of 175.

When it is desired to view another frame or another segment of another film strip, control unit 180 is again operated, whereupon solenoid 130 is again actuated to pivot window 124 downwardly at which time the motor 82 is energized in the opposite direction to drive the film strip into the cassette. Then, solenoid 87 is energized to urge wheel 63 away from the cassette. Motor 54 is then energized to raise or lower the cassette to the new operating position and solenoid 87 is deenergized forcing wheel 63 into engagement with the film strip portion 15 of the desired film strip. Motor 82 is then actuated after solenoid 130 has been energized to force window 124 downwardly. The film strip can then move between windows 122 and 124 and sensor 160 again senses the proper segment. When the film strip stops, motor 82 and solenoid 130 are de-energized. During the foregoing steps, motors 108 and 110 are simultaneously energized to move yoke 94 so that the optical path of the optical system is aligned with the region to be occupied by the frame whose image is to be viewed.

At the completion of a viewing operation using the film strips of one cassette, the cassette is manually removed from bracket 40 by pulling it through opening 38. Another cassette containing a plurality of film strips 14 can then be moved into place in the holder and the foregoing operations can then be repeated.

We claim:

1. In information retrieval apparatus a support; means on the support for mounting an information-containing strip in an operative position for movement with respect thereto; a rotor; means mounting the rotor for frictional engagement with a side edge of the strip disposed in said operative position; and means coupled with the rotor for rotating the same in opposed directions to thereby move said strip relative to said support.

2. In apparatus as set forth in claim 1, wherein said rotor has an outerperipheral, strip-receiving groove.

3. In apparatus as set forth in claim 1, wherein said rotor includes a pair of relatively shiftable disks normally in face-to-face engagement, means biasing the disks toward each other, one of the disks being movable axially of and away from the other disk.

4. In apparatus as set forth in claim 1, wherein said rotor mounting means includes an arm pivotally mounted on said support for movement relative thereto in opposed directions to thereby move the rotor toward and away from said operative position, means biasing the arm in one of said directions, and means coupled with the arm for selectively moving the same in the opposite direction.

5. In apparatus as set forth in claim 4, wherein said strip moving means includes a reversible drive motor carried by said arm.

6. In apparatus as set forth in claim 1, wherein said strip mounting means includes a cassette adapted to support a number of strips in stacked relationship therewithin and having an open end through which the strip can be moved, means shiftably mounted on the support for receiving and holding the cassette, said receiving and holding means being operable to move the cassette in a direction and by an amount to cause a strip in the cassette to be moved into said operative position, said cassette having means permitting the rotor to engage the strip disposed at said operative position, and means coupled with said cassette mounting means for selectively moving the same.

7. In apparatus as set forth in claim 6, wherein said cassette has a side provided with an opening therein, said film strip having a portion extending into the opening when the strip is in said operative position, the portions of the cassette bounding said opening defining said permitting means.

8. In apparatus as set forth in claim 1, wherein said strip mounting means includes a strip holder adapted to shiftably support a number of strips, means shiftably mounted on the support for receiving and supporting the strip holder, said receiving and holding means being operable to move said strip holder in a direction and by an amount sufficient to cause a strip in said strip holder to be moved into said operative position, said strip holder having means permitting the rotor to engage the strip disposed at said operative position.

9. In apparatus as set forth in claim 1, wherein the axis of rotation is generally perpendicular to the plane of the strip when the latter is in said operative position.

10. In information retrieval apparatus: a support; means on the support for mounting an information-containing strip thereon for movement with respect thereto; a rotor rotatably mounted on the support adjacent to said operative position and frictionally engagable with a side edge of the strip for moving the strip relative to said support and along a predetermined path upon rotation of said rotor; and means adjacent to said path and responsive to the position of the strip along the same for controlling the operation of said rotor.

11. In apparatus as set forth in claim 10, wherein said controlling means includes structure coupled with said moving means for sensing indicia on the strip as the latter moves along said path.

12. In apparatus as set forth in claim 11, wherein said moving means includes a reversible drive motor responsive to a control signal, said sensing means being operable to generate said control signal as a function of the strip position along said path.

* * * * *